(12) United States Patent
Docquier et al.

(10) Patent No.: US 9,115,016 B2
(45) Date of Patent: Aug. 25, 2015

(54) METHOD FOR HEATING A CHARGE

(75) Inventors: Nicolas Docquier, Philadelphia, PA (US); Bernard Labegorre, Paris (FR); Bernard Zamuner, Garches (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1566 days.

(21) Appl. No.: 12/307,735

(22) PCT Filed: Jul. 5, 2007

(86) PCT No.: PCT/FR2007/051599
§ 371 (c)(1),
(2), (4) Date: Jan. 6, 2009

(87) PCT Pub. No.: WO2008/003909
PCT Pub. Date: Jan. 10, 2008

(65) Prior Publication Data
US 2009/0311639 A1    Dec. 17, 2009

(30) Foreign Application Priority Data
Jul. 6, 2006    (FR) .................................. 06 52846

(51) Int. Cl.
| F23C 5/06 | (2006.01) |
| F27B 1/26 | (2006.01) |
| C03B 5/235 | (2006.01) |
| C21C 5/52 | (2006.01) |
| F23C 5/08 | (2006.01) |
| F27B 3/20 | (2006.01) |
| F27D 99/00 | (2010.01) |

(52) U.S. Cl.
CPC .............. *C03B 5/235* (2013.01); *C21C 5/5217* (2013.01); *F23C 5/08* (2013.01); *F27B 3/205* (2013.01); *F27D 99/0033* (2013.01)

(58) Field of Classification Search
CPC ......... C03B 5/235; C03B 5/2353; F23C 5/08; F27B 1/26; F27D 19/00
USPC ........ 432/19, 20, 22, 27; 431/8, 12, 181, 187, 431/9, 10, 186; 239/1, 5, 429–431, 433, 239/434
See application file for complete search history.

(56) References Cited

U.S. PATENT DOCUMENTS

| 2,308,902 A | * | 1/1943 | Weller ............................ 432/20 |
| 3,078,084 A | * | 2/1963 | Foresi et al. .................. 266/214 |
| 3,578,793 A | * | 5/1971 | Jones et al. ................ 239/132.3 |
| 4,927,357 A | * | 5/1990 | Yap ................................ 432/22 |

(Continued)

FOREIGN PATENT DOCUMENTS

| EP | 1 213 364 | 6/2002 |
| WO | WO 97/44618 | 11/1997 |

OTHER PUBLICATIONS

International Search Report for PCT/FR2007/051599.

*Primary Examiner* — Gregory A Wilson
(74) *Attorney, Agent, or Firm* — Christopher J. Cronin (57) ABSTRACT

The invention relates to a method for heating a charge using a flame generated by a lance and/or a burner, characterized in that, in a first phase, the flame is directed towards the charge and in that, in a second phase, the flame is directed more or less parallel to the charge.

16 Claims, 5 Drawing Sheets

(56) References Cited

U.S. PATENT DOCUMENTS

| | | | |
|---|---|---|---|
| 5,511,970 A * | 4/1996 | Irwin et al. | 431/9 |
| 5,554,022 A * | 9/1996 | Nabors et al. | 431/10 |
| 5,609,481 A * | 3/1997 | Kobayashi | 432/22 |
| 5,788,920 A * | 8/1998 | Okamoto et al. | 266/225 |
| 5,833,447 A | 11/1998 | Bodelin et al. | |
| 5,954,498 A * | 9/1999 | Joshi et al. | 432/19 |
| 5,984,667 A * | 11/1999 | Philippe et al. | 431/175 |
| 6,068,468 A * | 5/2000 | Philippe et al. | 431/175 |
| 6,113,386 A * | 9/2000 | Shannon et al. | 432/59 |
| 6,142,765 A | 11/2000 | Ramaseder et al. | |
| 6,237,369 B1 * | 5/2001 | LeBlanc et al. | 65/134.1 |
| 6,350,118 B1 * | 2/2002 | Philippe et al. | 432/196 |
| 6,659,762 B2 * | 12/2003 | Borders et al. | 431/8 |
| 7,686,611 B2 * | 3/2010 | Joshi et al. | 431/8 |
| 8,070,480 B2 * | 12/2011 | Potgieter et al. | 431/8 |
| 8,578,738 B2 * | 11/2013 | Tsiava | 65/136.3 |
| 2001/0007737 A1 * | 7/2001 | Tackels et al. | 431/8 |
| 2003/0054301 A1 * | 3/2003 | Borders et al. | 431/8 |
| 2007/0037106 A1 * | 2/2007 | Kobayashi et al. | 431/8 |
| 2007/0238061 A1 * | 10/2007 | Eichler | 432/19 |
| 2010/0068666 A1 * | 3/2010 | Zamuner et al. | 431/181 |
| 2010/0178626 A1 * | 7/2010 | Min | 431/354 |
| 2012/0324951 A1 * | 12/2012 | Tsiava | 65/29.12 |

* cited by examiner

METHOD FOR HEATING A CHARGE

CROSS-REFERENCE TO RELATED APPLICATIONS

This application is a §371 of International PCT Application PCT/FR2007/051599, filed Jul. 5, 2007.

BACKGROUND

The present invention relates to a method for heating a charge using a flame having a variable orientation with regard to the charge, this orientable flame being generated in particular by a lance and/or a burner and more particularly a lance and/or a burner comprising at least one channel for injecting at least one main jet, such as a jet containing oxidizer, fuel, or a premixture of oxidizer and fuel.

In practice, when the burner is designed, the conditions of interaction of the various jets or flows of oxidizer and fuel used by the burner are determined. Once the burner has been built, only the operating conditions can be modified.

The operating conditions of industrial combustion processes may evolve over time. This is inherently the case of intermittent processes, but it is also the case of continuous processes for which the characteristics of the charges to be heated may vary according to production requirements. It is more generally the case of any production unit subject to aging or sensitive to the variable conditions of its environment.

To adapt the performance of burners to variable operating conditions, the operator usually can only vary two parameters: the operating power of the burner and the excess oxidizer (oxygen superstoichiometry).

Some combustion technologies allow for discrete operating modes. This is the case for example of burners called "dual pulse" burners which use two different injection systems according to whether the burner is operated at low or high pulse. These two operating modes serve to increase the range of operation or use of the burner.

However, modifications of the operating point and/or mode are usually insufficient to optimize the performance of the burners or the processes using these burners under all conditions. For example, the cyclic introduction of solid material at ambient temperature into a melting furnace will lead the operator (or the control system) to increase the heating power so as to obtain the fastest possible fusion (in order to increase productivity), but without necessarily degrading the melting charge (product quality) nor overheating the furnace (equipment service life). This compromise between productivity and quality and/or service life depends in particular on the capacity of the system to transfer the energy to the charge, while avoiding local overheating of the charge or of the furnace refractories. This compromise is reflected by a melting time below which any gain in productivity is counterbalanced by a degradation of product quality or by the reduction of the furnace service life.

WO-A-9744618 teaches a burner comprising a central jet of fuel first surrounded by a plurality of jets of primary oxidizer, followed by a plurality of jets of secondary oxidizer. This makes it possible to modify the position of the flame during operation.

The use of variable direction flames in a furnace is also known from EPA-A-1213364.

It is the object of the invention to propose to control the heating of a charge without causing local overheating.

SUMMARY OF THE INVENTION

According to the invention, the heating of the charge is such that, in a first phase, the flame generated by a lance and/or a burner is directed toward the charge and, in a second phase, the flame is directly substantially parallel to the charge.

In particular, during the first phase, the flame injection or incidence angle $\phi$ may be between about 90° and 5°, typically between about 90° and 10°. During the second phase, the flame injection or incidence angle $\phi$ is typically between about 5° and 0°.

In the context of the present invention, injection or incidence angle means the angle $\phi$ of the flame to the horizontal. When the incidence is zero, the flame is horizontal and parallel to the plane defined by the free or exposed surface of the charge (in the case of a solid charge, ignoring the irregularities of the free surface). When the incidence is nonzero, the flame is inclined below the horizontal and directed toward the hearth of the melting end of the furnace. At an injection angle $\phi$ of 90°, the flame is directed toward the charge and perpendicular to the plane defined by the free surface of the charge. At an injection angle $\phi$ of 0°, the flame direction is parallel to the plane defined by the free surface of the charge.

Preferably, the flame injection angle $\phi$ during the first phase is between 5° and 75°, more preferably between 25° and 45°.

The burner/lance advantageously comprises a refractory port (for example of ceramic).

The flame, whose direction must thus be varied, is preferably generated using a lance and/or a burner having a fixed position. This requires causing the flame to shift by other than mechanical means. In fact, mechanical means are potential sources of malfunctions, particularly in hostile environments, such as fireboxes at high temperature.

Particularly in the case of a lance and/or burner having a fixed position, the flame may be created by at least one variable direction jet, resulting from the interaction between at least one jet of fluid, called main or primary jet, and at least one other jet of fluid, called secondary jet or actuator.

The main jet is advantageously a jet containing oxidizer, fuel, or a premixture of oxidizer and fuel.

The lance/burner may usefully comprise at least one oxidizer injection channel and at least one fuel injection channel, disposed concentrically with one another. The lance/burner may also comprise one oxidizer injection channel and at least one fuel injection channel which are separate, preferably parallel to one another.

According to an alternative, the flame also has a variable opening. The term "opening" of a jet or a flame generally designates, for a jet issuing from a line, the angle between the longitudinal axis of the line and the generatrix of the jet/flame surface.

More particularly, the flame may be created by at least one jet resulting from a variable direction (and optionally also opening), said jet resulting from the interaction between at least one jet of main fluid and at least one jet of secondary fluid. Preferably, the ratio of the flow rates of at least one main jet and at least one secondary jet interacting with one another is varied, while more preferably, the change in direction of the flame results from the sole interaction of at least one main jet and at least one secondary jet.

The injection is suitable for modifying the thermal resistance between the flame and the charge in operation and continuously, in order to increase the heat transfer to the charge, without having to increase the energy input in the furnace, without degrading the quality of the molten charge, and while increasing the productivity without reducing the service life of the furnace.

The performance of the method according to the invention can be controlled in a closed loop or an open loop.

Thus the inventive method may, for example, be a method comprising the following steps:

injecting at least one jet of main fluid,
injecting at least one jet of secondary fluid,
causing at least one jet of main fluid to interact with at least one jet of secondary fluid in order to generate at least one jet resulting from this interaction, said interaction allowing the variation of the direction and/or opening of said resulting jet and thereby of the flame.

Preferably, the number of secondary jets interacting with a main jet to obtain the desired effect on the resulting jet is minimized in order to reduce the production cost of the lance/burner and also the cost of the feed and control system of the flow rates of the fluids, if the actuated jets are to be controlled independently. A unidirectional effect can be obtained preferably with a single actuator. (The direction of a jet/flame is defined as being a unitary vector normal to the flow cross section of the fluid oriented in the flow direction, that is from upstream to downstream).

The type of fluid in the secondary jets or actuator jets is selected according to the intended application. In practice, the same fluid is often used for the main jet and for the actuator jet(s). However, it is possible, for example, to use, for controlling the deviation of an air jet, a mixture of air and helium (having a lower density) or to increase the entrainment of the flue gases in a flame whereof the fuel is propane, to control the main jet of fuel and/or of oxidizer, with a secondary jet of steam.

As to the physicochemical properties of the fluid used to produce the secondary jets or actuators, they may be selected to control certain properties of the resulting flow. For example, the reactivity of a mixture of main fuel (for example natural gas), oxidizer (for example air) jets can be modified by the use of oxygen (or other oxidizer), and/or hydrogen (or other fuel).

The invention thus covers a method for heating a charge using a tool generating a flame such as a burner or a lance described in the present application, in which the ratio of the pulses is modified if necessary, on the one hand of the jet of oxidizer and/or of fuel and/or of the premixture and, on the other, of the jet of secondary fuel, in order to vary the direction (and/or the opening) of the flame with regard to the charge.

In certain cases of the inventive method, the fuel injection flow rate may be zero. The tool that generates a flame is then a lance (for injecting an oxidizer such as oxygen, for example) whereof the jet has a variable direction (and optionally opening). Obviously, a lance can also be used to inject fuel, liquid and/or gas and/or solid, for example a powdered coal lance (gas such as air which propels the solid powder such as coal).

If, just before the interaction of the main and secondary jets, the tip of the lance is equipped with a nozzle comprising a convergent/divergent part (also called Laval nozzle in the literature), it is possible to obtain, at the outlet of the divergent part (in a manner known per se in the literature) a supersonic jet of main fluid, for example a supersonic jet of oxygen which can then have a variable direction (optionally variable opening but by generally losing its supersonic speed, thereby serving to alternate the subsonic and supersonic speeds in certain processes).

It is optionally possible to adjust the main jet by means of the secondary jet preferably when the speed of the fluid jet issuing from the Laval nozzle is only subsonic (by decreasing the pressure upstream of the Laval nozzle). In a subsonic injection phase, this may serve to "sweep" the overall charge by adjusting the main jet in the manner described in the present application, and then, in a supersonic phase, to obtain a more limited or even no adjustment (low momentum of the secondary jet at the same zero momentum) on the supersonic main jet (application in metallurgy on a converter, electric furnace, etc.).

According to an alternative, the flame is diverted in order to sweep at least part of the surface of the charge. It is possible thereby, for example, to divert the flame by using at least two auxiliary jets, in order to obtain a variation in the flame direction in at least two secant planes (for example, deviation along the width of the furnace and deviation along the length of the furnace). This serves in particular to cover the entire surface of the charge without local overheating.

BRIEF DESCRIPTION OF THE FIGURES

Figure 1:
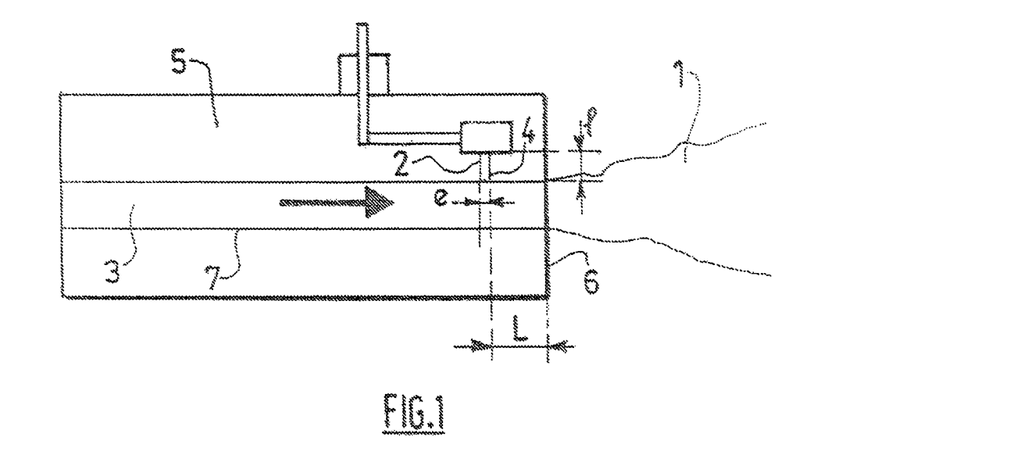
FIG. 1: a schematic of the interaction of the jets in a lance or a burner usable in the method of the invention.

The injection will be better understood from the following embodiments, which are nonlimiting, in conjunction with the figures which show:

FIG. 1 shows a schematic of a burner or a lance usable in the method to vary the direction (and optionally the opening) of the flame.

The main jet 3 issuing from the main injector 7 interacts with the actuator jet 2 issuing from the secondary injector 4 thereby creating a resulting jet 1 having a different direction and/or opening from the jet 3 in the absence of an actuator jet 2.

It may be observed in FIG. 1 that the actuator jet 2 conveyed by the secondary injector 4 which has the form of a line passing through the material 5, for example a block surrounding the channel 7, said actuator jet 2 terminating via the secondary injector 4, preferably substantially perpendicular to the jet 3. The main jet 3 exits here into the interior of the material 5, that is before the ejection of the jet from the main injector 7.

The interaction between the jets preferably occurs (as shown) inside the means delivering the main jet (tube, refractory port, etc.) before said main jet exits from said means, or optionally where the main jet issues from these means or close to this location.

Figure 2:
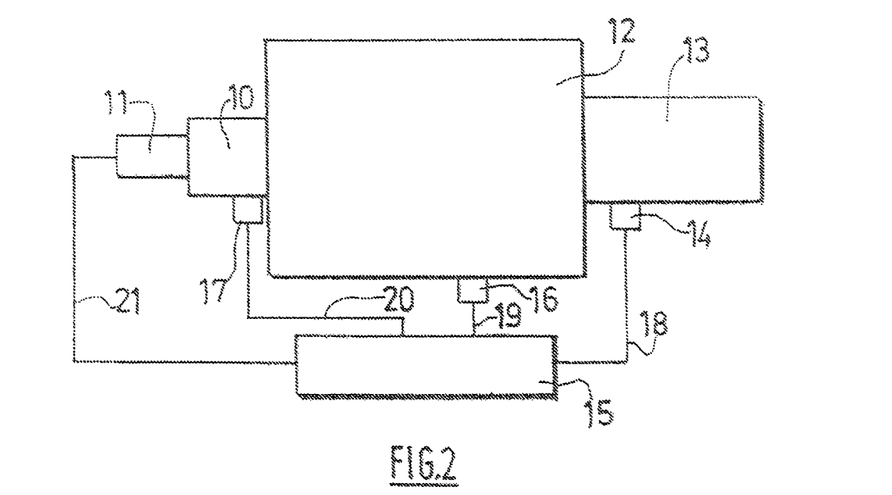
FIG. 2: schematic of a control of the performance of the method.

FIG. 2 shows a schematic of a method for controlling the performance of a jet from a lance or from a burner using a system of jets according to the invention.

The sensors 14, 16 and 17 measured quantities characterizing the flue gases and operating conditions of the method and/or of the firebox and of the burner. These measurements are transmitted via lines 18, 19 and 20 to the controller 15. The latter, according to the setpoints given for these characteristic quantities, determines the operating parameters of the actuators in order to maintain the characteristic quantities at their setpoint values and, by means of the line 21, transmit these parameters to the control members of the actuators 11.

Figure 3A:
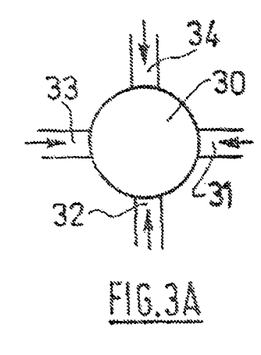
FIGS. 3A and B: schematic of actuator jets for controlling the direction of the resulting jet/flame.
Figure 3B:
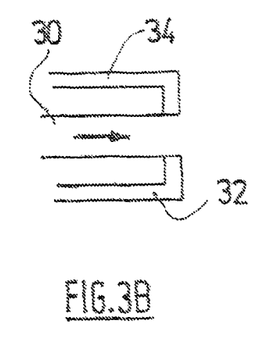

FIGS. 3A and 3B show a schematic of an actuator for controlling the direction of a jet/a flame.

FIG. 3A is a front view of a jet 30 comprising four actuator jets 31, 32, 33 and 34 disposed respectively for example at 90° from one another and issuing in perpendicular incidence to the direction of the main jet 30. FIG. 3B shows a side view of the assembly in FIG. 3A. The actuator jets 31 and 33 have not been shown.

If in the absence of an actuator jet, the main jet 30 flows perpendicular to the plane of FIG. 3A, the injection of a jet into the injector 33 allows a rightward deviation of the resulting jet in FIG. 3A (toward 31), that is in the same sense as the flow direction of the jet 33 (and the same direction). If the jet 34 is actuated simultaneously, according to the relative momentums of the jets 33 and 34, a resulting jet can be obtained deviating in a direction (projected in the plane of FIG. 3A) which may vary continuously between the directions of the jets 33 and 34 (rightward and downward in FIG. 3A).

Figure 4A:
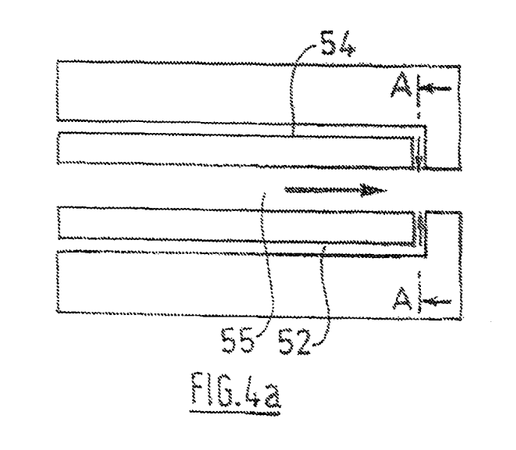
FIGS. 4A and B: schematic of actuator jets for controlling the opening of the resulting jet/flame.
Figure 4B:
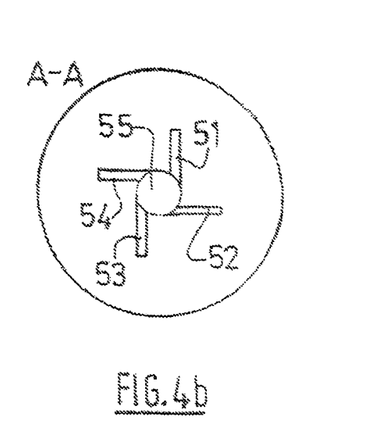

FIGS. 4a and b show a schematic of an actuator for controlling the opening of a jet/a flame.

In FIG. 4a, which shows a longitudinal cross section of an injection device, the main jet 55 (which flows from the left to the right in the figure) encounters the actuator jets (shown in FIG. 4b which is a front view along AA in FIG. 4a) 51, 52, 53 and 54, which impact the main jet 55 tangentially, thereby permitting, according to the pulses of these various jets, to more or less "open" the main jet 55. This opening effect is essentially due to the fact that the actuator jets and the main jet have non-intersecting axes, although the jets have a mutual physical interaction. This causes a rotation of the main jet about itself and thereby a change in opening of the jet/the flame.

To obtain a directional and opening effect simultaneously, the teaching of the above sections is combined.

Figure 5:
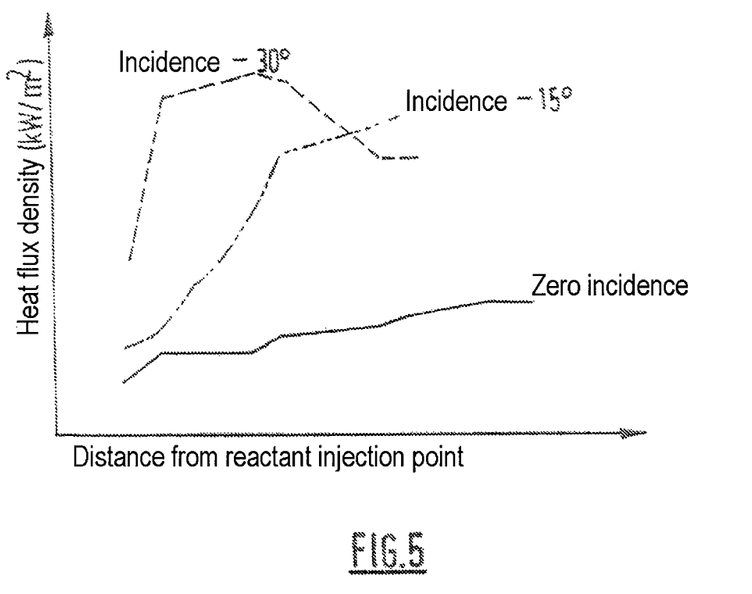
FIG. 5: heat flux density of a flame as a function of the distance from the injection point, at various incidences.

FIG. 5 shows three profiles of heat flux transferred by a flame to a charge according to the angle of incidence of the flame to the charge as a function of the distance from the injection point of the reactants on the burner axis. A very sharp increase in the heat flux transferred to the charge is observed with increasing incidence of the flame. For zero incidence ($\phi=0$—see FIG. 7B), the heat flux is substantially constant along the whole length of the flame; for an incidence of 15°, the flux transferred increases rapidly, and then slightly slower from point A, whereas for a flame incidence of 30°, the flux transferred increases extremely quickly up to point B, and then at lower speed substantially up to point A, from which the transfer decreases.

Figure 6:
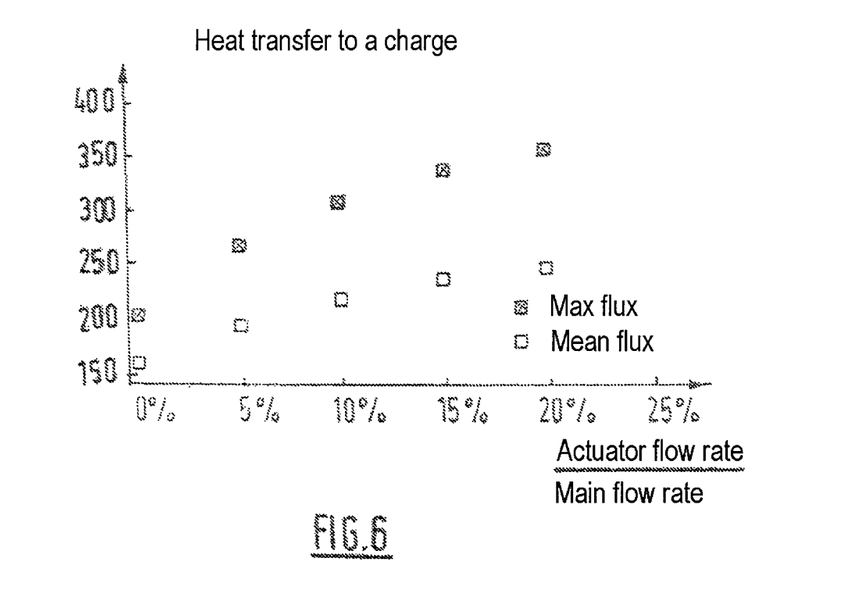
FIG. 6: heat transfer to the charge as a function of the ratio of the flow rate of the actuator jets to the main jet.

FIG. 6 shows the heat transfer to a charge by a variable direction flame produced by the interaction of a main jet with actuator jets. FIG. 6 more particularly shows the heat flux delivered as a function of the ratio of the flow rate of the actuator jets to the flow rate of the main jet (also shown here as a percentage of the flow rate of the main jet), both for the fuel jet and for the oxidizer jet (burner with separate injection). Each jet initially injected in parallel above the charge is progressively diverted toward the charge, thereby increasing the heat transfer to the charge.

The invention is illustrated below for the case of a burner used to heat any charge which may be a metal charge or any other charge that must be melted and/or heated to a high temperature, and then maintained at said temperature, for example a charge of ferrous or nonferrous metal, glass, cement or, on the contrary, a charge that must be dried from a liquid bath.

It is possible to apply the invention to a steel treatment tool in an electric arc furnace, for example as follows: the tool comprises a flame (usually subsonic) which serves to heat the metal, to melt it, particularly at the start of a fusion. This flame, as explained in the present application, may have a variable direction by equipping each main jet (oxidizer, fuel, premixture) or at least one main jet with one actuator jet which varies its direction (and optionally its opening), in order to shift the flame toward the charge, without requiring large scale mechanical means which change the direction of the burner body.

At the center of the tool, a supersonic speed injection channel is generally provided (equipped with a Laval nozzle) for injecting gas such as oxygen, nitrogen, etc. This channel may itself be equipped with an auxiliary jet injection channel to vary the direction of the jet (subsonic or supersonic). Actuator jets may also be provided to increase the opening of the main jet, for example when the speed is subsonic. In general, the actuation of such actuator jets on a main jet at supersonic speed is avoided because one generally tries to maintain the jet opening angle as low as possible in this case, in order to increase the penetration of this supersonic jet.

In certain operating phases, a central jet (for example oxygen, nitrogen, etc.) at supersonic speed can be used, surrounded by a flame in order to preserve as long as possible a speed close to its initial speed at the outlet of the nozzle (convergent/divergent).

Depending on the steps of the method in the electric furnace, the flame may optionally have a more or less wide opening (that is, covering the supersonic jet along a more or less long distance).

The examples below relate to the control of the heat transfer of a burner using the invention to a charge in a process for melting a charge, for example a metal charge (which may comprise solid and/or liquid portions). Such examples may be implemented in particular using a control method as described above.

An aluminum smelting furnace is generally equipped with one or more burners surrounding one or more of these side walls surrounding the melting end of the furnace, placed above the flux line of the metal when the latter is completely melted (liquid). The axis of the flame when it is horizontal is located at a height of between 10 and 100 cm above this flux line, preferably between 40 and 80 cm.

EXAMPLE 1

Case of Solid Material in the Furnace

In this example, injectors are used so that the incidence of the flame is variable. Each fluid jet is injected into the chamber of the furnace via an injector.

In the first part of the aluminum smelting cycle, when the metal is mainly present in the solid state, the flame is adjusted so that it has a nonzero incidence (flame axis between 5° and 75° preferably between 25° and 45°). This setting serves to considerably improve the heat transfer of the burner and thus to reduce the melt time (as explained with the help of FIG. 6).

When most of the blocks of metals of solid metal are melted, the flame is adjusted to have a zero incidence angle. The flame is therefore parallel to the flux line of the liquid metal. This setting serves to continue to transfer energy to the charge and to complete the melting of the metal or to refine it by limiting the overheating of the already molten metal and, in consequence, its oxidation by the flame or by the flue gases.

Figure 7A:
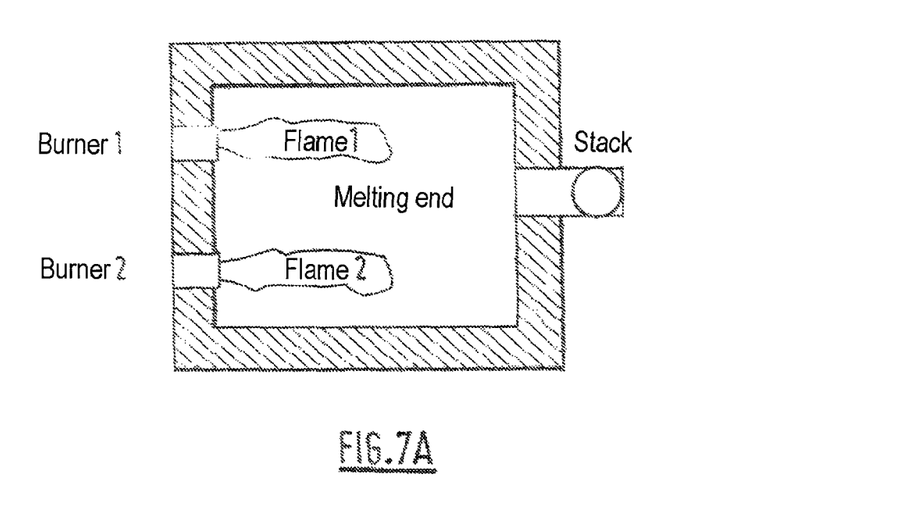
FIGS. 7A and B: schematic of the method for heating a charge.
Figure 7B:
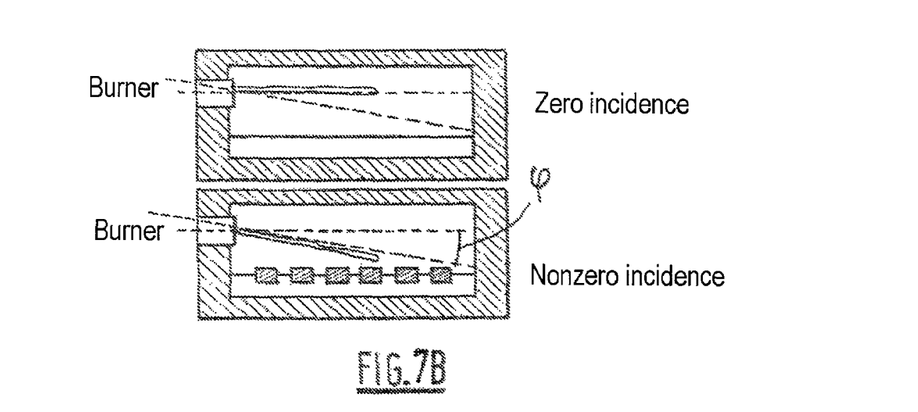

Between the extreme positions of the flame described above (positive incidence and zero incidence), it is possible to adopt an intermediate, static setting during the first part of the cycle, in which the incidence of the flame is between 5° and 30°, preferably between 10° and 25°, to obtain a compromise between the coverage of the furnace charge by the flame (area projected by the flame on the bath) and the intensity of the heat transfer. FIGS. 7A and B illustrate the positions of the flame with regard to the charge in the two phases of the heating process.

FIG. 7A shows a plan view of an aluminum smelting furnace equipped with two burners according to the invention producing two flames positioned above the metal bath.

The flue gases produced by the flames are discharged via the stack of the furnace.

FIG. 7B shows a side view of the same furnace at the level of one of the flames.

In FIG. 7B, the lower part, the flame is inclined at an angle φ to the horizontal, preferably when the solid metal is still present in the melt, whereas in the upper part of this figure, the flame is positioned at zero incidence (φ=0).

Between the extreme positions of the flame (positive incidence and zero incidence), the angle of incidence of the claim may also be varied periodically during the first part of the cycle.

For example, in the first phase, the furnace operator may vary, optionally manually, the incidence between 5° and 45° or between 10° and 45°, and then return to 0° in the second phase. Preferably, the burner is controlled with a control unit in order to periodically adjust burner control ratio, that is, the ratio of the pulses of the main and actuator jets and in consequence, the incidence of the flame on the bath. The control signal from the control unit may be sinusoidal, triangular, square, etc, with a variable frequency from 0.05 Hz to 100 Hz, preferably triangular at a frequency of 0.1 to 10 Hz. The periodic variation in the position of the flame serves to make the heat transfer uniform within the furnace and thereby to melt the solid elements more rapidly.

EXAMPLE 2

Uniform Energy Transfer to the Charge

Figure 8:
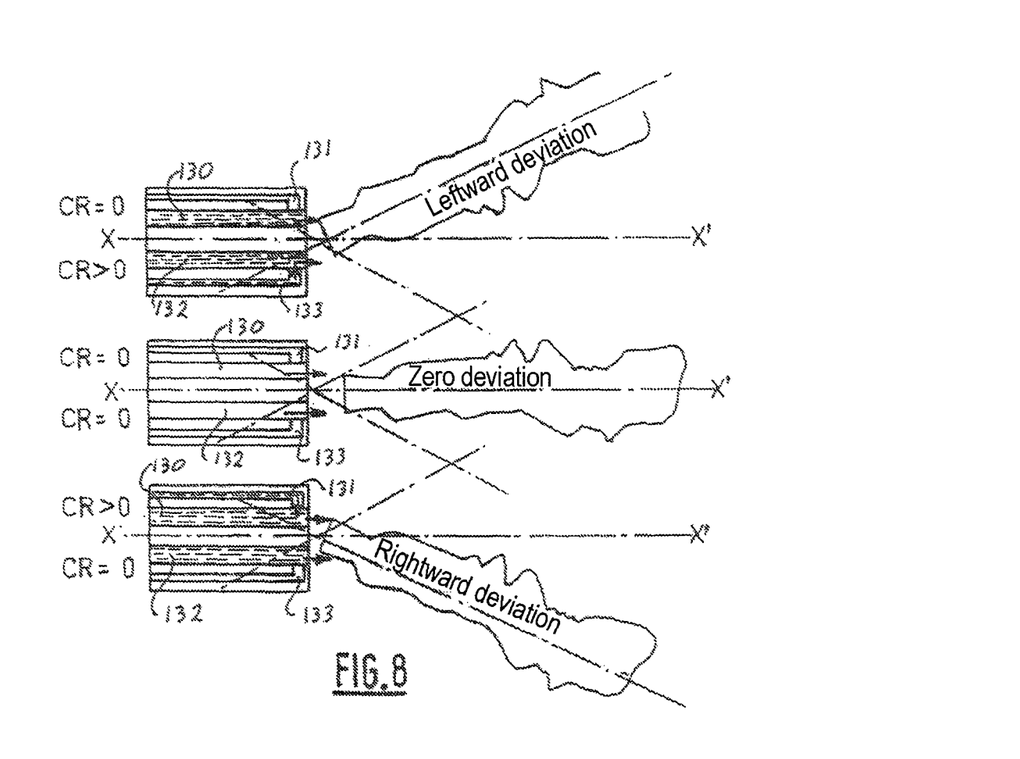
FIG. 8: schematic showing a lateral shift of the flame.

In this example, injectors according to the invention are used so that the horizontal orientation of the flame can be modified as desired according to the control ratio of each injector as shown in FIG. 8.

Each fluid jet is injected into the furnace chamber via such an injector, but for jets issuing from injection points located in the same horizontal plane or horizontal planes slightly spaced from one another (from one to two jet diameters, for example), it may be sufficient to use these injectors only for the peripheral jets when they can interact with the other jets to be diverted.

The variation in the horizontal orientation can be obtained in the two leftward and rightward directions, either by equipping each main jet with two lateral actuator jets, or by equipping each peripheral main jet with a single actuator jet, capable of actuating the main jet in the horizontal direction but in directions opposite one another. The main injector axis can also be shifted so that at zero control ratio, the flame is naturally diverted (rightward or leftward) with regard to the axis X-X' of the burner in FIG. 8, and can thereby vary the orientation of the flame by progressively increasing the control ratio of the control system (that is, to obtain a jet along axis X-X' with a nonzero control ratio).

The use of one or more burners with variable flame orientation serves to increase the coverage of the charge by horizontal travel of the flame.

(The expression control ratio used above is defined as the ratio of the flow rate of the actuator jet to the main jet, with the understanding that the pulse of a flue jet can be controlled simply by varying the opening of a valve, the increase in the opening of a valve being proportional to the increase in the flow rate of the jet, all other things remaining equal).

When the control ratios of the burner(s) are zero, the flame is oriented in the natural axis of the burner and the flame covers a portion of the charge. When one of the control ratios is not zero, the position of the flame is diverted and the flame covers another portion of the charge.

FIG. 8 shows an example of a horizontal shift of a flame above a charge: each main jet 130, 132 (oxidizer or fuel) is provided with an actuator jet 131, 133; in the upper part of FIG. 8, the control ratio CR of the jet 130 is zero, that is, no fluid is injected into the channel 131; the control ratio CR of the jet 132 however, is positive, which means that since 133 acts from the bottom upward in the figure, the actuator jet 133 diverts the main jet 132 upward in the figure, that is, leftward with regard to the burner axis X-X'.

In the central part of FIG. 8, the control ratios of the two main jets 130 and 132 are zero, (CR=0), so that there are no actuator jets in action and the flame is propagated along axis X-X'.

In the lower part of FIG. 8, the control ratio CR of the jet 130 and of the jet is positive, causing a downward deviation of the flame in the figure (rightward in the plan view), the main jet 132 and the actuator jet 133 having a zero control ratio (no jet 133).

As shown in example 1, the furnace operator can manually, periodically or not, vary the control ratios in order to modify the position of the flame. The control ratios may also be adjusted using a control unit for periodically adjusting the control ratio of the burner.

Thus, each burner can cover a larger portion of charge, favoring the uniformity of heat transfer and thereby limiting the possible formation of hotspots if refractory materials are included in the bath (for example alumina-based waste, recycled or in the course of formation by oxidation of the metal during the melting), and thereby favoring the overall heat transfer in order to accelerate the melting process at constant power, or to reduce the energy consumption at constant melting time.

EXAMPLE 3

Variable Incidence Flame on the Charge Which Sweeps the Charge Laterally

EXAMPLE 4

Closed Loop Control

This exemplary embodiment of the invention serves to control the horizontal and vertical movement of the flame according for example to various furnace operating parameters, given by various types of sensor installed on the furnace, and particularly the heat flux, temperature, or possibly chemical composition sensors (for example TDL type laser diode).

A control loop of which the sensor is a measuring device serves to obtain an image of the heat transfer to the charge or the oxidation of the aluminum bath, this information serving to decrease or increase the transfer to the charge by adjusting the flow rate of the actuator jet as explained above.

A control loop for controlling the flame position based on the measurement of the bath temperature, when at least a portion of the bath is present in the liquid state. As long as the bath temperature is lower than a value Tc, of between 650 and 750° C. for example for aluminum, the flame must remain at nonzero incidence on the bath to maximize the heat transfer. Upon approaching the value Tc, the flame is progressively raised to deviate from the bath, especially when the target value is reached, in order to limit the risks of oxidation of the charge. The flame incidence is then regulated to maintain the temperature at its target value.

A control loop for controlling the position of the flame based on the measurement of the heat flux:

This heat flux can potentially be evaluated from the difference in temperatures read between two thermocouples immersed in the bath at two different depths, but on the same generatrix perpendicular to the hearth of the furnace.

The heat flux can also be deducted from the heat transfers calculated through the hearth of the furnace, also by measuring the temperature difference therein. Due to the higher resistivity of the hearth, consisting of refractory materials, it is easier to obtain a significant temperature gradient.

The heat flux can also be monitored by a flux-meter placed for example in the arch of the melting chamber. In fact, all other things remaining equal, any decrease in the flux perceived by the arch and observed by the flux-meter, will correspond at least partially to an increase in the heat flux transmitted to the charge (it is less important to know the absolute value of the heat flux transmitted to the charge (or the losses of the walls) than the variation over time of the signal corresponding to it).

The charge begins to melt with a flame in positive incidence on the charge, this incidence being preserved as long as the flux transmitted to the charge remains high. As soon as this flux decreases, revealing an increase in the temperature of the charge and a decrease in its heat absorption capacity, the flame is progressively raised to divert it from the bath, in order to limit the risk of oxidation or overheating of the charge.

A control loop for controlling the flame position based on the measurement of a composition of the flue gases leading the furnace or inside the furnace, for example before the flue gas manifold of the furnace, above the bath, between the incident flame and the aluminum bath, etc., for detecting one or more species revealing the oxidation of the aluminum bath such as CO:

a. The flue gas composition can be measured in a manner known per se by extraction followed by analysis (conventional analyzers, TDL or other) or in-situ by absorption (laser diode or other) or by electrochemical probe).

b. The melting begins with a flame in positive incidence on the charge, and this incidence is preserved as long as the charge oxidation tracer or tracers are stable and in a small quantity. As soon as the concentration of the oxidation tracer or tracers increases, the flame is progressively raised to divert it from the bath, in order to limit the concentration of the tracer or tracers, and hence the oxidation of the charge, by adjusting the main jet via the actuator jet as explained above.

c. Furthermore, the flame position can be adjusted to reach a setpoint value and then to maintain a precise concentration setpoint of the oxidation tracer. It is in fact possible to fix a concentration threshold that must not be exceeded and permanently adjust the incidence of the flame to achieve this.

It must be observed that in all cases when the charge consists at least partly of cold solid, the flame incidence to the charge can be made positive because as long as the temperatures remain moderate, for example lower than 600° C. for aluminum, the oxidation rate remains low. When the charge has become essentially liquid, the regulation used becomes important to prevent the temperature rise of the metal and the oxidation thereof. For an application of the invention to the heating of a material other than aluminum, for example to heat a glass melt, etc., the same control principles apply, for temperatures and criteria which are different from one material to the other, but which are in themselves well known to a person skilled in the art.

It will be understood that many additional changes in the details, materials, steps and arrangements of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for heating a charge contained in a furnace using a flame generated by a lance and/or a burner said method being performed two phases, wherein in the first phase, the charge is mainly in a solid state and the flame is directed toward the charge in a non-parallel direction, and in a second phase, and when most of the charge is in a molten state, a direction of the flame is adjusted so that the direction of the flame is substantially parallel to a horizontal surface of the molten charge.

2. The method of claim 1, wherein the lance and/or the burner is in a fixed position producing a flame with a variable direction.

3. The method of claim 2, wherein, during the first phase a flame injection angle $\phi$ with respect to horizontal is between about 90° and 5° and in that during the second phase, the flame injection angle $\phi$ is between 5° and about 0°.

4. The method of claim 2, wherein a flame injection angle $\phi$ with respect to horizontal during the first phase is between 5° and 75°.

5. The method of claim 2, wherein a flame injection angle $\phi$ with respect to horizontal during the first phase is between 25° and 45°.

6. The method of claim 1, wherein, during the first phase a flame injection angle $\phi$ with respect to horizontal is between about 90° and 5° and in that during the second phase, the flame injection angle $\phi$ is between 5° and about 0°.

7. The method of claim 1, wherein a flame injection angle $\phi$ with respect to horizontal during the first phase is between 5° and 75°.

8. The method of claim 1, wherein the flame being created by at least one directional jet, said jet being obtained by an interaction between at least one jet of main fluid and at least one jet of secondary fluid.

9. The method of claim 8, wherein the ratio of the flow rates of at least one main jet and at least one secondary jet which interact with one another is varied.

10. The method of claim 9, wherein the change in direction of the flame results from the sole interaction of at least one main jet and at least one secondary jet.

11. The method of claim 9, wherein the main jet is a jet containing oxidizer, fuel and an oxidizer and fuel premixture.

12. The method of claim 8, wherein the change in direction of the flame results from the sole interaction of at least one main jet and at least one secondary jet.

13. The method of claim 12, wherein the main jet is a jet containing oxidizer, fuel and an oxidizer and fuel premixture.

14. The method of claim 8, wherein the main jet is a jet containing oxidizer, fuel and an oxidizer and fuel premixture.

15. The method of claim 1, wherein the charge is a charge of ferrous or nonferrous metal or glass.

16. The method of claim 1, wherein a flame injection angle $\phi$ with respect to horizontal during the first phase is between 25° and 45°.

\* \* \* \* \*